Aug. 3, 1926.
H. W. HUNTLEY ET AL
1,594,733
TEMPERATURE REGULATOR
Filed Dec. 18, 1922      5 Sheets-Sheet 1
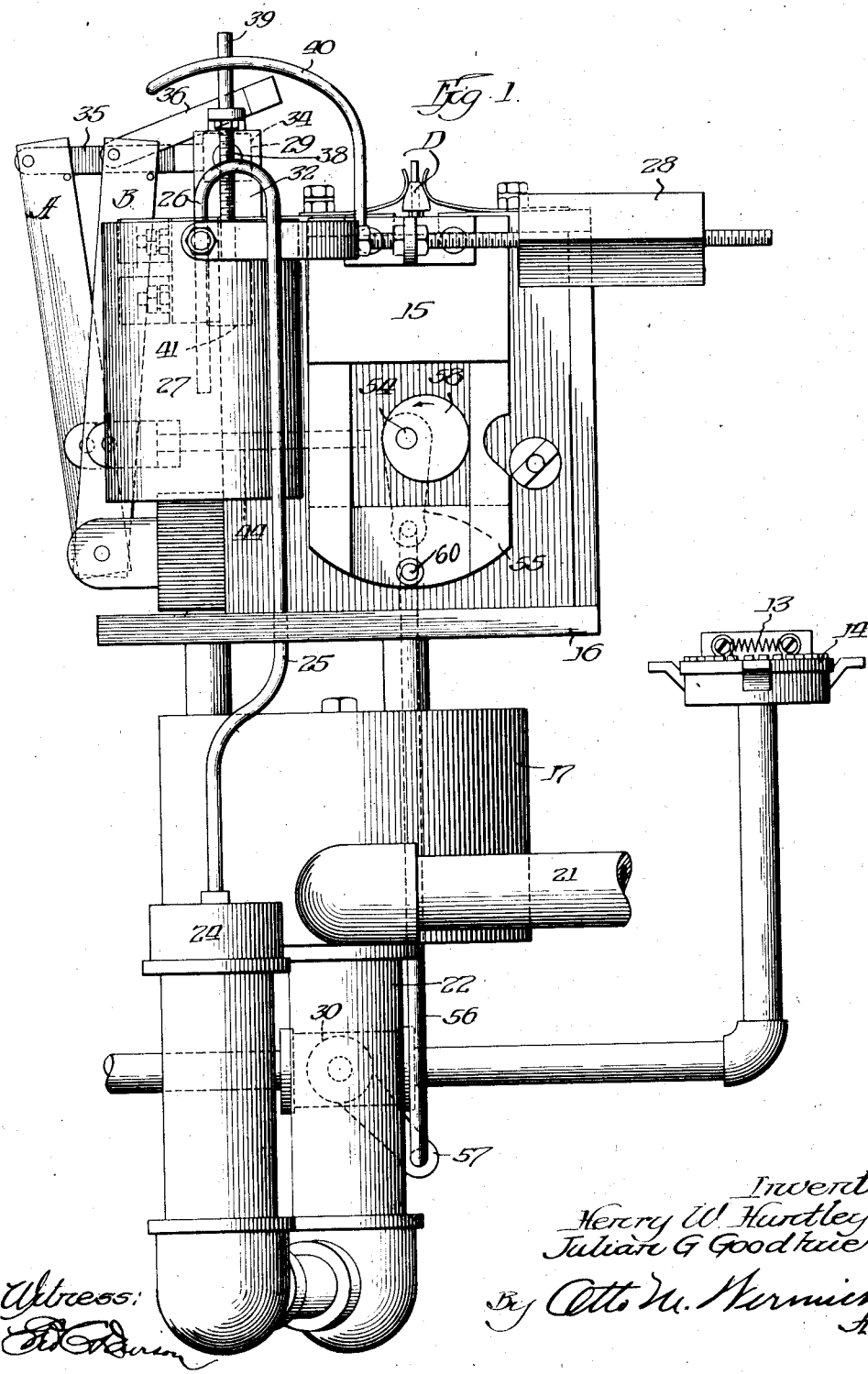

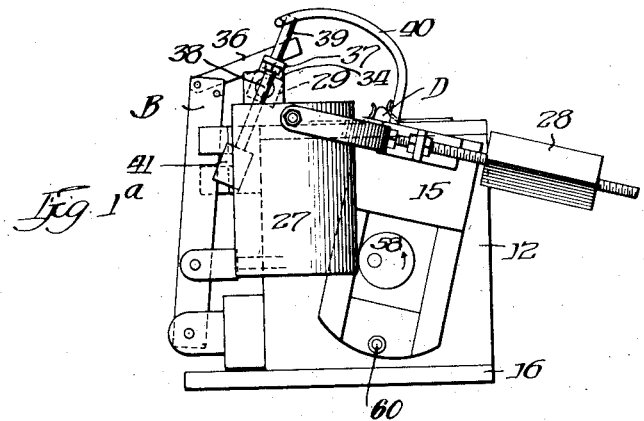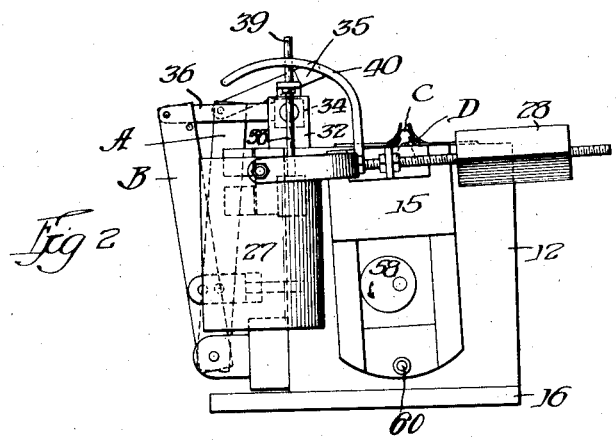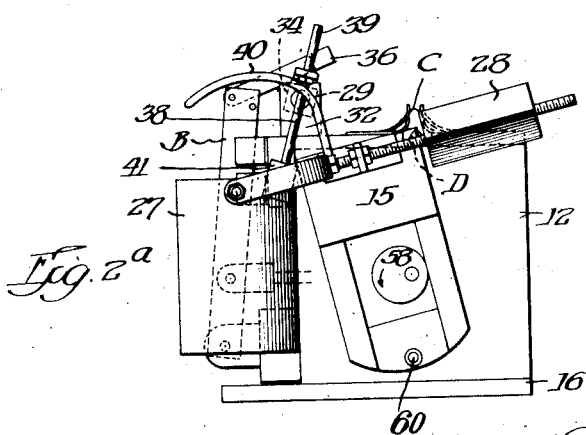

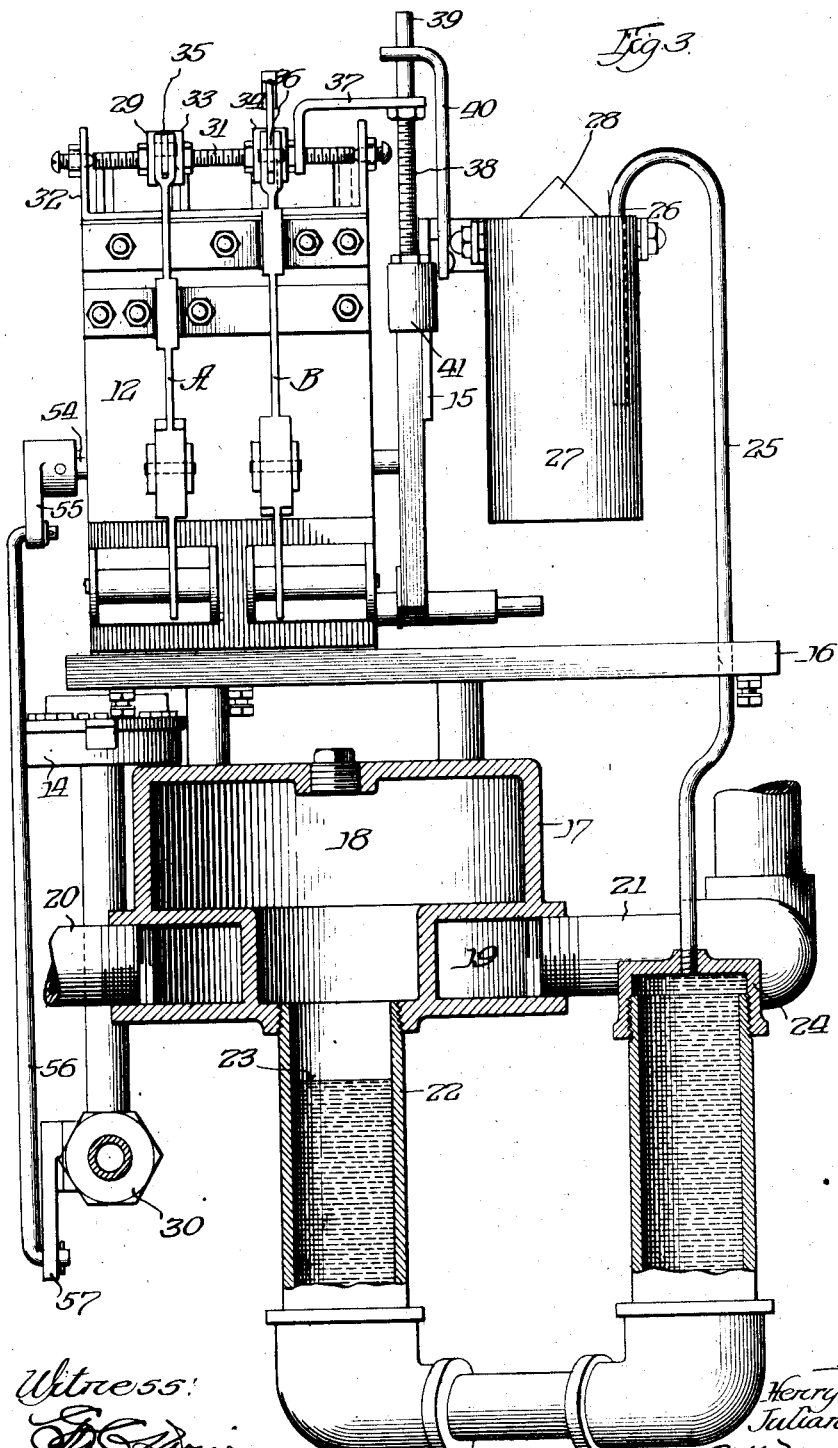

Aug. 3, 1926.

H. W. HUNTLEY ET AL
TEMPERATURE REGULATOR
Filed Dec. 18, 1922

Witness:
Fred C. Davison

Inventors,
Henry W. Huntley
Julian G. Goodhue
By Otto M. Wernich
Atty.

Aug. 3, 1926.

H. W. HUNTLEY ET AL

TEMPERATURE REGULATOR

Filed Dec. 18, 1922

Patented Aug. 3, 1926.

1,594,733

UNITED STATES PATENT OFFICE.

HENRY W. HUNTLEY, OF CHICAGO, AND JULIAN G. GOODHUE, OF EVANSTON, ILLINOIS, ASSIGNORS TO THE TRUSTEES OF THE ELECTRO THERMOSTATIC CONTROL COMPANY, OF CHICAGO, ILLINOIS, A TRUST ESTATE.

TEMPERATURE REGULATOR.

Application filed December 18, 1922. Serial No. 607,574.

The invention relates to temperature regulators and is herein shown and described in conjunction with a heating apparatus wherein the commodity to be regulated is water which it is desired to maintain at a certain temperature.

The invention has as one feature the provision of a device of the character above referred to having combined therewith a switch, a mechanism for opening the switch and means for holding the switch in an open position, said means being operable to release the switch to permit said switch to close after the commodity to be regulated reaches a predetermined temperature.

It is a further object to employ a motor which cooperates to actuate the switch to open it.

It is another object of the invention to provide the structure with a thermostatically controlled device which is operable to release the holding means and thus permit the switch to close and in addition it is an object to provide a holding means which is automatically set so that it will be in a position to permit of its being engaged by the thermostatically controlled device upon the actuation of the latter.

It is also a feature of the invention to employ a motor and to associate therewith a mechanism which is operable thereby to a predetermined position, from which position said mechanism is movable to actuate the switch controlling or locking mechanism.

It is an additional object of the invention to open and close or otherwise control by a motor an element such as a valve or other structure which controls the flow of the medium whereby the temperature of the commodity to be regulated is maintained.

It is a further object of the invention to arrange an igniter in circuit with the motor so that said igniter will be extinguished when it has performed its function.

It is an object to arrange a motor in the circuit so that it will be brought to a state of rest when a certain element, such, as for instance, a valve which controls the flow of the medium for varying the temperature of the commodity is opened, the motor being again operable to close the valve after the commodity has reached the desired temperature.

The invention has these and other objects all of which will be explained and more readily understood when read in conjunction with the specifications and drawings forming a part hereof which disclose one embodiment of which the invention is susceptible, it being obvious that changes and modifications may be resorted to without departing from the spirit of the appended claims forming a part hereof.

In the drawings Figure 1 is a side elevation of a temperature regulator.

Figure 1ª illustrates the structure in the position it assumes when the container 27 is lightened by withdrawing the fluid therefrom.

Figure 2 shows the switching mechanism in its intermediate position to which it is moved by the motor through the medium of eccentric 58.

Figure 2ª shows the switching mechanism in the position to which it moves when a sufficient quantity of fluid has been ejected into container 27 to cause the actuation thereof.

Figure 3 is an end view of structure shown in Figure 1.

Figures 4, 5:
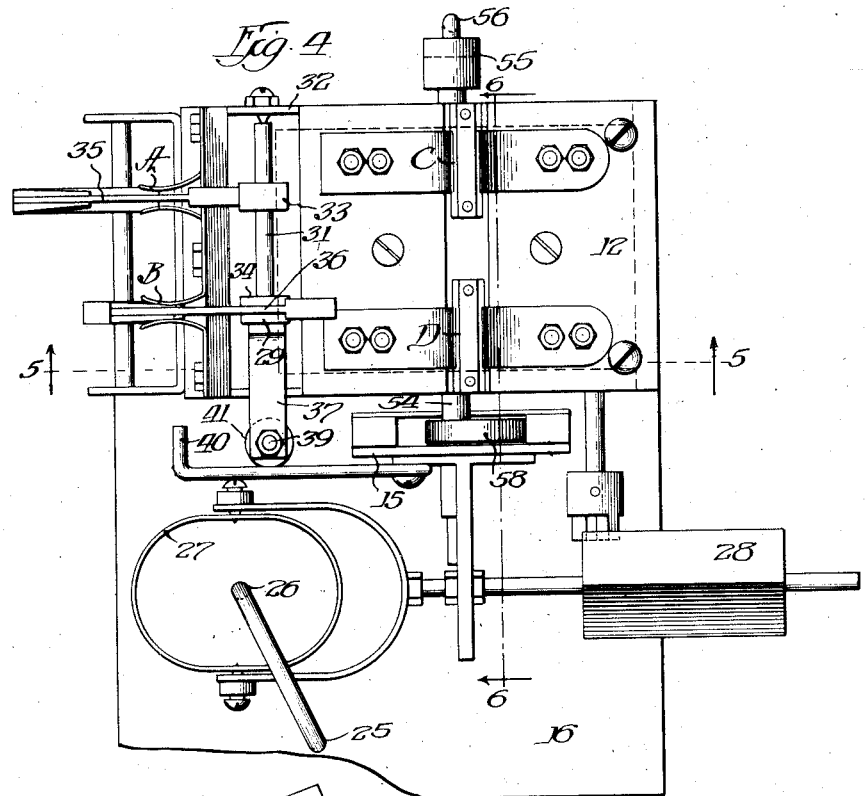
Figure 4 is a plan view of Figure 1.
Figure 5 is a section taken on line 5—5 of Figure 4.
Figure 6:
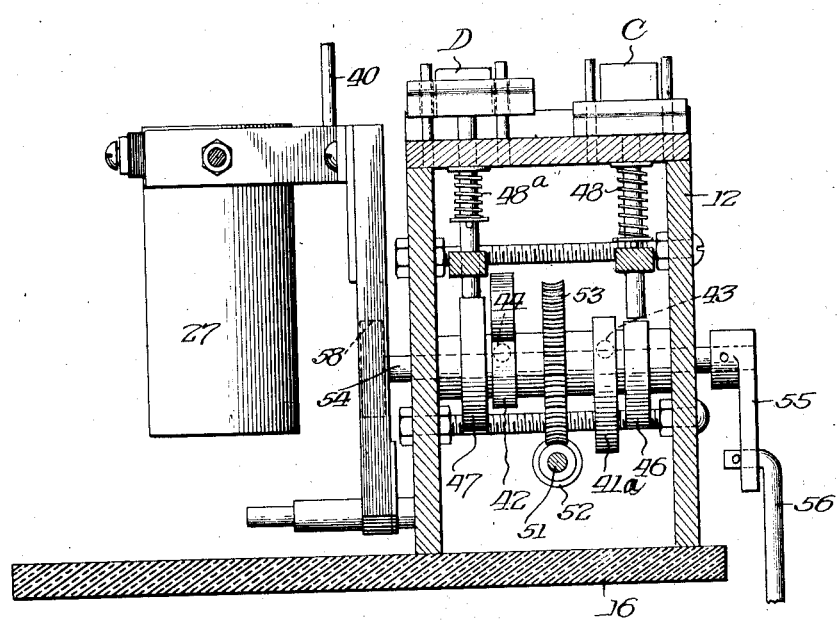
Figure 6 is a section taken on line 6—6 of Figure 4.
Figure 7:
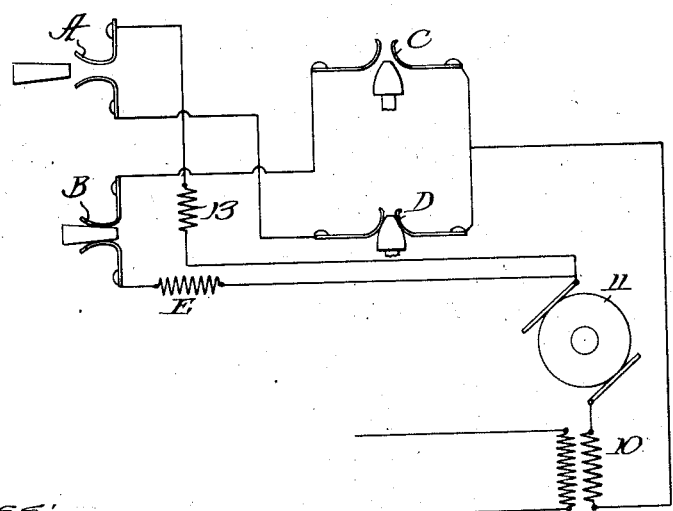
Figure 7 is a diagrammatic view of the circuit with switches in the position shown in Figure 1.

The structure illustrated includes a transformer 10, a motor 11, a housing generally designated 12 within which is arranged certain gears and cams employed in the structure. The device also includes a heat coil 13, burner 14 and a thermostatically controlled rocker generally designated 15 which is pivotally supported on the fixed pin 60. These elements are all mounted upon the support 16, below which is arranged a thermostat generally designated 17.

It is understood that any suitable thermostatically actuated mechanism may be employed to control the structure, that herein shown and described includes an expansion chamber 18 within which atmosphere is confined.

Another chamber 19 is employed and arranged adjacent the chamber 18. This chamber is constructed to permit water to circulate therethrough. In the present instance this water is the commodity the temperature of which it is desired to regulate, this water flowing through the passage or chamber 19 affects the temperature of the atmosphere contained in the expansion chamber 18 and causes another fluid to be actuated which is discharged into and withdrawn from a receptacle, the contents of this receptacle controls the actuation of the structure.

Pipe connections 20 and 21 are made with the chamber 19 and are provided to permit the water to circulate through said chamber.

Another pipe connection 22 is employed which communicates with the chamber 18 and has confined therein a suitable amount of fluid 23 which in the present instance is oil or may be any other suitable liquid. The pipe connection 22 may be as illustrated of a U-shaped formation, it being closed at one extremity by a cap 24 to which is connected a relatively small pipe or passage 25, the latter of which extends upwardly to beyond the support 16 and has its uppermost end 26 arranged so that it terminates in the cup or receptacle 27 so that the oil 23 may be discharged into and extracted from the receptacle 27 when caused to act in this manner by the pressure created by the expansion and contraction of the contents of the expansion chamber 18.

The pressure existing in the chamber 18 being variable in accordance with the temperature of the water flowing through the chamber 19 and throughout the system causes the discharge into and extraction of the oil from the receptacle 27.

It is evident that when relatively cold water is passed through the chamber 19 that the atmosphere in the chamber 18 will be contracted which will reduce the pressure existing in the chamber 18 and allow the fluid 23 in the pipe 22 to move toward the chamber. This action of the fluid 23 will cause that fluid 23 contained in the receptacle 27 to be extracted therefrom. The extraction of the fluid from the receptacle 27 causes the weight 28 to overbalance the receptacle 27 and cause the rocker 15 to move in a clockwise direction. This movement of the rocker and mechanism associated therewith causes a holding device generally designated 29 to be actuated to release a switch and causes the actuation of the motor 11 and the heating of the coil 13.

A plurality of pairs of switches are employed in the structure one pair being designated A and C and the other B and D. When the device is at rest and in the position thereof shown in Figure 1 switches B and D are closed and switches A and C are open, switch A being held open by a certain holding mechanism 29 hereinafter to be explained. The switch B is also constructed to be held open by the holding mechanism 29.

Referring to Figures 1, 1ª, 2 and 2ª the relative positions of the various elements employed are illustrated.

In the illustration designated Fig. 1 the device is at rest with the cycle complete, the device remains in this position until thermostatically caused to move to the position illustrated in Figure 1ª, this position of the element is caused by the lowering of the temperature of the commodity to be regulated which extracts the fluid 23 from the receptacle 27 and permits the weight 28 to move the rocker 15 in a clockwise direction, which movement unlocks switch A. When the parts are in the position illustrated in Figure 1ª all switches except C are closed, this actuates the motor and causes eccentric 58 to move the rocker. The operation of the motor causes the rocker and switches to move to the position shown in Figure 2 in which switches B and D are open and A and C are closed, and the motor comes to a rest with the cycle half completed. The structure remains in this position until the increased temperature causes the fluid 23 to be forced into the receptacle 27 causing the rocker 15 to move contra clockwise into the position shown in Figure 2ª, which movement unlocks switch B. When the elements assume this position all of the switches are closed execept D, the motor is actuated which causes the eccentric 58 to assume the position illustrated in Figure 1 in which position switches B and D are closed and A and C are opened, and the motor comes to a rest with the cycle completed.

When the thermostat permits the parts to assume the position shown in Figure 1ª current will then flow from transformer through the motor, heat coil 13, switch A, switch D and back to the transformer 10. Current continues to flow until the parts assume the position illustrated in Figure 2 when the opening of switch D breaks the circuit and brings the motor to rest with the gas burning. The gas continues to burn until the thermostat causes the parts to assume the position shown in Figure 2ª. The current then passes from the transformer 10 to motor 11 from the motor through a resistance coil E and then through switches B and C and thence to transformer 10. Current continues to flow until the parts assume the position shown in Figure 1 when the opening of switch C. breaks the circuit and brings the motor to rest with gas turned off. The elements are at this time again in the position illustrated in Figure 1.

The particular holding mechanism employed consists of a shaft 31 which is journaled in the bracket 32. This shaft carries the elements 33 and 34 having flat faces which cooperate with the ends of the arms 35 and 36 respectively carried by the blades of the switches A and B to lock either of said switches in an open position.

A bracket 37 is connected to the shaft 31 and has fixedly secured to it a rod 38. One end of this rod such as 39 is designed to cooperate with an arm 40 which is secured to the rocker 15, the arm 40 being employed to engage the end 39 of the rod 38 to actuate the holding mechanism of switch B when the rocker 15 moves in a clockwise direction as shown in Figure 1ª.

The opposite end 41 of the rod 38 extends into the path of the rocker 15 so that it may be engaged thereby to trip or unlock the switch A when said rocker is moved in a direction so that it will assume the position shown in Figure 2ª.

It will be noted that the holding mechanism is automatically restored to a position in which it may engage and hold one of the switches in an open position after it has caused the release of the other switch.

As before stated the motor is designed to move the switches such as A and B to an open position in which position they may be engaged and held by the holding mechanism. The mechanism for moving said switches A and B to an open position and to a position in which they may be engaged by the holding mechanism to hold them in an open position, is so designed that after the switches have been moved to an open position, the means which moved them is operable to a position in which said switches may assume a closed position upon the actuation of the holding mechanism.

A means is provided for also closing switches C and D and permitting them to open when the desired work is accomplished and it is time for the motor to come to rest.

The means employed for moving the switches A and B to an open position include the cams 41ª and 42 which are designed to move said switches outwardly or to an open position in which position they may be engaged and retained by the holding mechanism hereinbefore referred to.

This mechanism for moving switches A and B to an open position includes the rods 43 and 44 which are respectively connected to the blades of the switches A and B and respectively arranged to cooperate with the cams 41ª and 42 which actuate said rods and move the switches to open them.

A coiled spring such as 45 is arranged upon each of these rods and these springs act to move the switches A and B to a closed position when permitted to do so by the holding mechanism generally designated 29.

Cams 46 and 47 are provided to close the switches C and D. These switches are moved to assume an open position when permitted to do so by the position of the cams 46 and 47 by means of coil springs such as 48 and 48ª which are respectively associated with said switches.

To cause the rotation of these cams and also the actuation of certain other devices the motor shaft is provided with a worm 49 which cooperates with the worm wheel 50, the shaft 51 thereof being provided with a worm 52, the latter of which cooperates with the worm wheel 53 which is mounted upon the shaft 54. This shaft 54 carries the several cams 41ª—42—46 and 47 and in addition has a crank arm 55 connected to it which through the medium of the rod 56 is connected with the crank 57 of the valve 30. Thus it is apparent that when the motor is actuated the valve 30 will be moved to an open or closed position and thereby permit or prevent the flow of fuel to the burner and also that the several switches will be actuated in a manner corresponding to that above described.

This cam shaft 54 also carries an eccentric 58 which is provided to cooperate with the rocker 15 to move said rocker from the position which it assumed upon the extraction of the fluid 23 from the container 27 to a substantially vertical position from which position the rocker is moved to the position shown in Figure 2ª when the weight of the fluid 23 flowing into the container 27 overbalances the weight 28.

From the foregoing description it is manifest that an arrangement is provided whereby a switch may be moved from a closed to an open position and locked in this last named position and unlocked by a thermostatically actuated mechanism.

It is further evident that the thermostat has no electrical connection with any of the switch elements employed and that it only performs the function of actuating the locking or holding mechanism of the switches.

From the foregoing description it is manifest that when the device is at rest with the fuel valve closed switches B and D are closed and the switches A and C are open as shown in Figure 1, the switch A being held open by its particular holding elements 33 and 35.

It is further evident that as the container is emptied the rocker will be moved in a clockwise direction as shown in Figure 1ª, holding mechanism controlling switch A is at this time actuated by the rod 40 attached to the rocker 15 and switch A is permitted to close allowing the motor to be actuated, which opens switch B positioning it to be engaged and releasably locked in this position. At this time eccentric 58 is rotated to move the rocker arm in a contraclockwise direction until it assumes a substantially vertical position as shown in Figure 2 which arranges the rocker so that the holding mechanism for the switches A and B is free to perform its locking function. During this period switch C is also closed, valve 30 is opened and the heat coil 13 heated after which switch D is opened which brings the motor to a rest and extinguishes the coil 13.

The rocker 15 and its associated mechanism remains in this substantially vertical position until the water throughout the system becomes heated.

The temperature of the water flowing through the chamber 19 being increased causes the atmosphere in the chamber 18 to expand which creates a pressure upon the fluid 23 causing it to be discharged from the end of the tube 25 into the container 27. When a sufficient amount of the fluid 23 is discharged into this container the weight thereof overbalances the weight 28 and causes the rocker arm and its associated mechanism to assume the position thereof illustrated in Figure 2ª.

During the movement of the rocker 15 and its associated mechanism in a contraclockwise direction the rocker engages the end 41 of the rod 38 which actuates the locking mechanism for the switch B and permits it to close, which permits the motor to start and simultaneously open switch A, close switch D, actuate the eccentric 58 so as to move rocker 15 in a clockwise direction to a substantially vertical position, as shown in Figure 1, closes the fuel valve and finally opens switch C at which time the motor comes to a rest, in which position the device is maintained until the fluid is again extracted from the container 27 at which time a repetition of the operation will take place.

Having thus described the invention what we claim and desire to cover by Letters Patent is:

1. In a device of the class described, the combination of a plurality of pairs of switches, a motor for opening said switches, means operable by the motor for permitting one pair of said switches to close, means tending to close another pair of switches, and thermostatically controlled means operable to permit said last mentioned pair of said switches to close.

2. In a device of the class described, the combination of a switch, resilient means for closing said switch, means for holding the switch open and thermostatically controlled means for causing the holding means to be actuated to permit the switch to close, a motor in circuit with said switch, a valve operable by said motor and an igniter controlled by said switch.

3. In a device of the class described, the combination of a switch, a motor, means operable by the motor for opening said switch, resilient means tending to close said switch, and means for holding the switch open and thermostatically controlled means for actuating the holding means to release the switch.

4. In a device of the class described, the combination of a switch, a motor, means operable by the motor for opening said switch, resilient means tending to close said switch, means for holding the switch open and thermostatically controlled means for actuating the holding means to release the switch, said motor being in series with said switch.

5. In a device of the class described, the combination of a switch, a motor, means operable by the motor for opening said switch, means tending to close said switch, and means for holding the switch open, thermostatically controlled means for actuating the holding means to release the switch, said motor being in series with said switch.

6. In a device of the class described, the combination of a switch, electrically operated means for opening said switch, means tending to close said switch, means for locking said switch open, thermostatically controlled means for unlocking said switch, a heat coil, said heat coil, switch and electrically operated means being in circuit with each other.

7. A device of the class described including a valve, means for operating said valve, a motor for driving said means, switches for controlling the operation of said motor, means operated by the motor for alternately opening and closing certain of said switches and independent means for holding one of said switches in its open position, an oscillatory counter-balanced mechanism for moving said independent means to releasing position, said oscillatory mechanism being subject to operation by the displacement of a fluid therein by the effect of temperature changes.

8. A device of the class described including a valve, means for operating said valve, a motor for driving said means, switches for controlling the operation of said motor, means operated by the motor for alternately opening and closing certain of said switches and independent means for holding one of said switches in its open position, an oscillatory counter-balanced mechanism for moving said independent means to releasing position, said oscillatory mechanism being subject to operation by the displacement of a fluid therein by the effect of temperature changes, and means driven by said motor for restoring said oscillatory mechanism.

In witness whereof, we hereunto subscribe our names this 13th day of December A. D. 1922.

HENRY W. HUNTLEY.
JULIAN G. GOODHUE.